United States Patent
Takahashi et al.

(10) Patent No.: US 11,403,424 B2
(45) Date of Patent: Aug. 2, 2022

(54) INFORMATION PROCESSING APPARATUS AND INFORMATION PROCESSING METHOD

(71) Applicant: SONY CORPORATION, Tokyo (JP)

(72) Inventors: Koki Takahashi, Kanagawa (JP); Masaaki Isozu, Tokyo (JP); Kazuhiro Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 82 days.

(21) Appl. No.: 16/644,364

(22) PCT Filed: Jul. 18, 2018

(86) PCT No.: PCT/JP2018/026920
§ 371 (c)(1),
(2) Date: Mar. 4, 2020

(87) PCT Pub. No.: WO2019/054043
PCT Pub. Date: Mar. 21, 2019

(65) Prior Publication Data
US 2021/0064782 A1 Mar. 4, 2021

(30) Foreign Application Priority Data
Sep. 14, 2017 (JP) .............................. JP2017-177085

(51) Int. Cl.
*G06F 21/62* (2013.01)
*G06F 16/901* (2019.01)
*H04L 9/06* (2006.01)

(52) U.S. Cl.
CPC ...... *G06F 21/6254* (2013.01); *G06F 16/9014* (2019.01); *H04L 9/0643* (2013.01); *H04L 2209/38* (2013.01)

(58) Field of Classification Search
CPC ...... G06F 21/6254; G06F 21/64; G06F 21/62; H04I 63/123; H04I 9/32
See application file for complete search history.

(56) References Cited

U.S. PATENT DOCUMENTS

2015/0161406 A1* 6/2015 Fox ..................... G06F 21/6245
726/27
2016/0180112 A1   6/2016 Bhagwan et al.
(Continued)

FOREIGN PATENT DOCUMENTS

AU   2016203090 A1   3/2017
AU   2017221777 A1   9/2017
(Continued)

OTHER PUBLICATIONS

Melanie Swan, "Blockchain- Blueprint for a New Economy", O'Reilly Media, Inc, Feb. 2015, 149 pages.
(Continued)

*Primary Examiner* — Olugbenga O Idowu
(74) *Attorney, Agent, or Firm* — Chip Law Group

(57) ABSTRACT

To enable a user himself/herself who is the owner of management data of a P2P database to disclose data while maintaining authenticity of the data. An information processing apparatus is provided including a creation unit that creates public data by using management data of a P2P database, and a registration control unit that controls registration of the public data to the P2P database, on the basis of first identification information that uniquely identifies the management data.

11 Claims, 18 Drawing Sheets

| NAME | USER U1 | |
|---|---|---|
| SEX | MALE | FIRST PORTION |
| DATE OF BIRTH | APRIL 20, 1980 | |
| AGE | 37 | |
| EXAM ID | A-123 | |
| SCORES OF RESPECTIVE SUBJECTS — SUBJECT 2 | 84 | SECOND PORTION |
| SUBJECT 3 | 88 | |
| SUBJECT 4 | 72 | |
| EXAM ID | B-234 | |
| SCORES OF RESPECTIVE SUBJECTS — SUBJECT 2 | 89 | THIRD PORTION |
| SUBJECT 3 | 90 | |
| SUBJECT 4 | 80 | |

(56) References Cited

U.S. PATENT DOCUMENTS

| | | | |
|---|---|---|---|
| 2016/0379013 A1* | 12/2016 | Ganesan | H04L 63/0823 |
| | | | 713/176 |
| 2017/0053002 A1 | 2/2017 | Bowman et al. | |
| 2017/0053357 A1 | 2/2017 | Bowman et al. | |
| 2017/0098101 A1 | 4/2017 | Bhagwan et al. | |
| 2017/0249482 A1 | 8/2017 | Takaai et al. | |
| 2017/0338957 A1* | 11/2017 | Ateniese | H04L 9/085 |
| 2018/0131706 A1* | 5/2018 | Anderson | H04L 63/20 |
| 2018/0205555 A1 | 7/2018 | Watanabe et al. | |
| 2019/0012481 A1 | 1/2019 | Bhagwan et al. | |

FOREIGN PATENT DOCUMENTS

| | | |
|---|---|---|
| CN | 107851253 A | 3/2018 |
| EP | 3133508 A1 | 2/2017 |
| EP | 3324355 A1 | 5/2018 |
| JP | 2017-098806 A | 6/2017 |
| JP | 2017-157926 A | 9/2017 |
| JP | 6483827 B2 | 3/2019 |
| WO | 2017/010455 A1 | 1/2017 |

OTHER PUBLICATIONS

Andreas M. Antonopoulos, "Mastering Bitcoin- Unlocking Digital Cryptocurrencies", O'Reilly Media, Inc, Dec. 2014, 298 pages.

International Search Report and Written Opinion of PCT Application No. PCT/JP2018/026920, dated Oct. 9, 2018, 09 pages of ISRWO.

Milanie Swan, "Blockchain-Blueprint for a New Economy", O'Reilly Media, Inc, Feb. 2015, 149 pages.

Andreas M. Antonopoulos, "Mastering Bitcoin", O'Reilly Media, Inc, Dec. 2014, 298 pages.

Extended European Search Report of EP Application No. 18856403.3, dated Sep. 14, 2020, 09 pages.

* cited by examiner

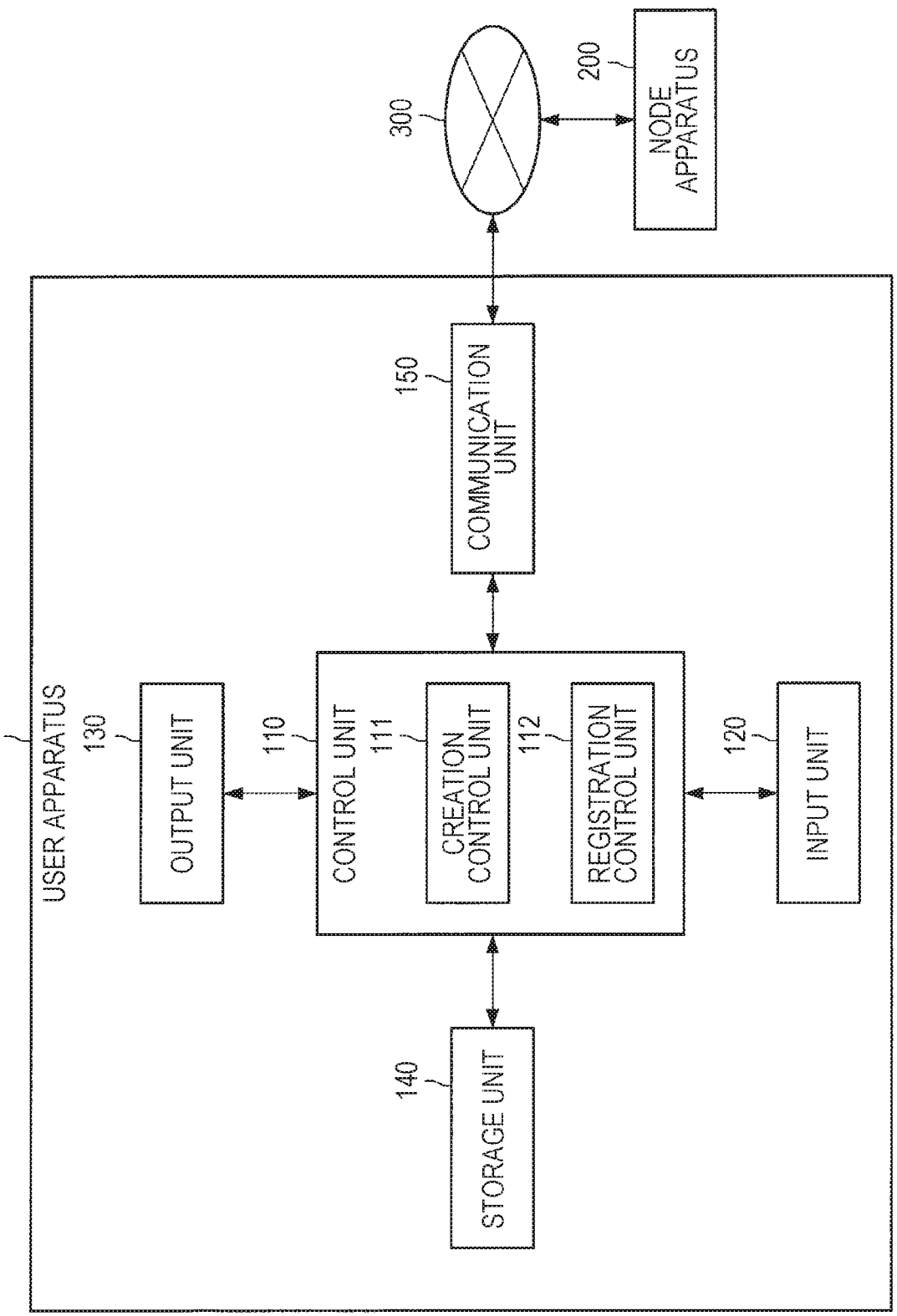

*FIG. 6A*

| NAME | USER U1 |
|---|---|
| SEX | MALE |
| DATE OF BIRTH | APRIL 20, 1980 |
| AGE | 37 |
| ADDRESS | ... |
| PHONE NUMBER | ... |
| ACADEMIC BACKGROUND | ... |
| ... | ... |
| EXAM ID | A-123 |
| SCORES OF RESPECTIVE SUBJECTS | SUBJECT 1 | 75 |
| | SUBJECT 2 | 84 |
| | SUBJECT 3 | 88 |
| | SUBJECT 4 | 72 |
| | SUBJECT 5 | 68 |
| TOTAL SCORE | 387 |

FIG. 6B

| NAME | USER U1 |
|---|---|
| SEX | MALE |
| DATE OF BIRTH | APRIL 20, 1980 |
| AGE | 37 |
| EXAM ID | A-123 |
| SCORES OF RESPECTIVE SUBJECTS | SUBJECT 2 | 84 |
| | SUBJECT 3 | 88 |
| | SUBJECT 4 | 72 |

FIG. 6C

| NAME | USER U1 |
|---|---|
| SEX | MALE |
| DATE OF BIRTH | APRIL 20, 1980 |
| AGE | 37 |
| ADDRESS | ... |
| PHONE NUMBER | ... |
| ACADEMIC BACKGROUND | ... |
| ... | ... |
| EXAM ID | B-234 |
| SCORES OF RESPECTIVE SUBJECTS | SUBJECT 1 | 69 |
| | SUBJECT 2 | 89 |
| | SUBJECT 3 | 90 |
| | SUBJECT 4 | 80 |
| | SUBJECT 5 | 74 |
| TOTAL SCORE | 402 |

FIG. 6D

| NAME | | USER U1 |
|---|---|---|
| SEX | | MALE |
| DATE OF BIRTH | | APRIL 20, 1980 |
| AGE | | 37 |
| EXAM ID | | A-123 |
| SCORES OF RESPECTIVE SUBJECTS | SUBJECT 2 | 84 |
| | SUBJECT 3 | 88 |
| | SUBJECT 4 | 72 |
| EXAM ID | | B-234 |
| SCORES OF RESPECTIVE SUBJECTS | SUBJECT 2 | 89 |
| | SUBJECT 3 | 90 |
| | SUBJECT 4 | 80 |

FIRST PORTION: NAME, SEX, DATE OF BIRTH, AGE

SECOND PORTION: EXAM ID A-123 and scores

THIRD PORTION: EXAM ID B-234 and scores

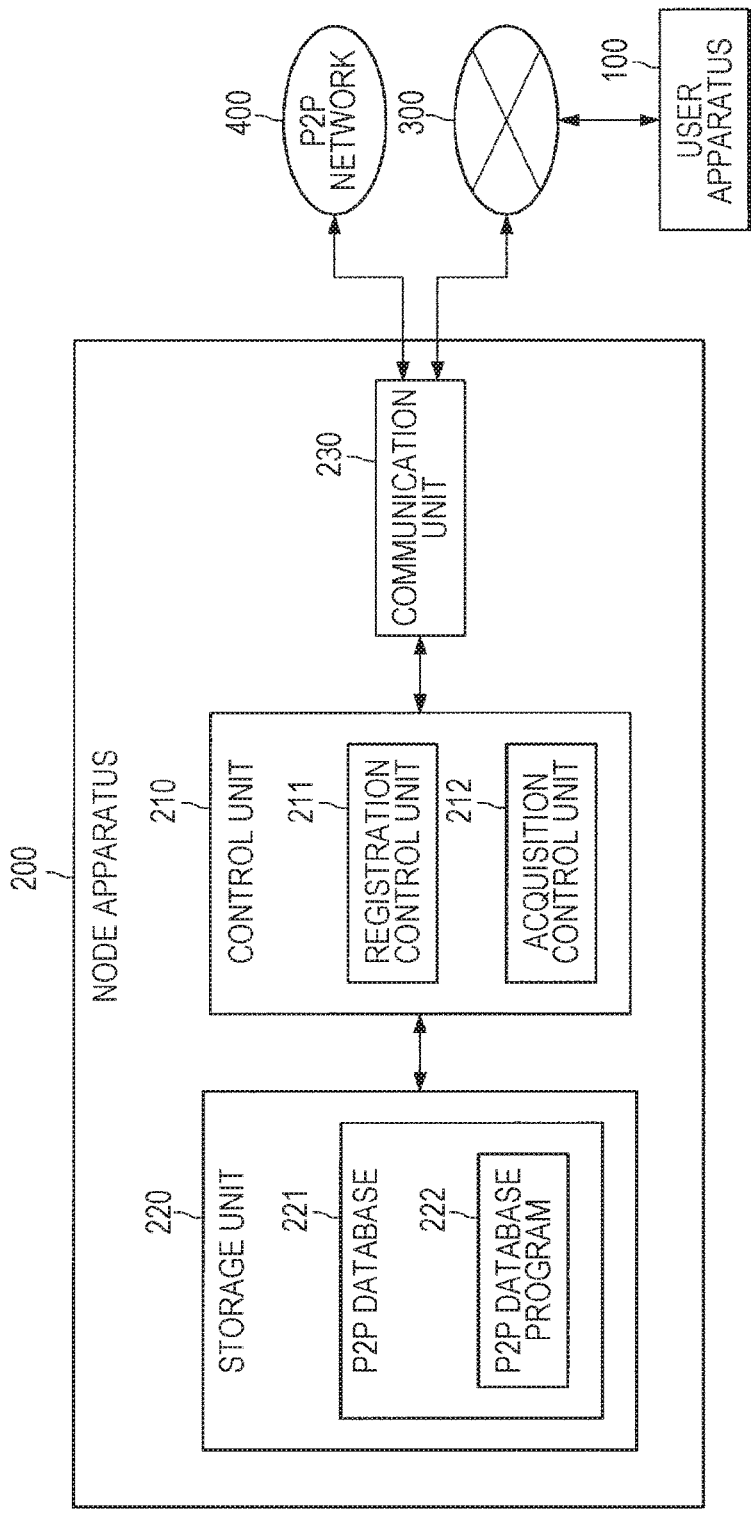

FIG. 11A

| NAME | USER U1 |
|---|---|
| SEX | MALE |
| DATE OF BIRTH | APRIL 20, 1980 |
| AGE | 37 |
| ADDRESS | ... |
| PHONE NUMBER | ... |
| ACADEMIC BACKGROUND | ... |
| ... | ... |
| LICENSE NUMBER | 123456789 |
| EXAM ID | A-123 |
| SCORES OF RESPECTIVE SUBJECTS — SUBJECT 1 | 75 |
| SCORES OF RESPECTIVE SUBJECTS — SUBJECT 2 | 84 |
| SCORES OF RESPECTIVE SUBJECTS — SUBJECT 3 | 88 |
| SCORES OF RESPECTIVE SUBJECTS — SUBJECT 4 | 72 |
| SCORES OF RESPECTIVE SUBJECTS — SUBJECT 5 | 68 |
| TOTAL SCORE | 387 |

FIG. 11B

| NAME | USER U1 |
|---|---|
| SEX | MALE |
| DATE OF BIRTH | APRIL 20, 1980 |
| AGE | 37 |
| LICENSE NUMBER | 123456789 |
| EXAM ID | A-123 |
| SCORES OF RESPECTIVE SUBJECTS — SUBJECT 2 | 84 |
| SCORES OF RESPECTIVE SUBJECTS — SUBJECT 3 | 88 |
| SCORES OF RESPECTIVE SUBJECTS — SUBJECT 4 | 72 |

FIG. 11C

| NAME | USER U1 |
|---|---|
| SEX | MALE |
| DATE OF BIRTH | APRIL 20, 1980 |
| AGE | 37 |
| ADDRESS | ... |
| PHONE NUMBER | ... |
| ACADEMIC BACKGROUND | ... |
| ... | ... |
| LICENSE NUMBER | 123456789 |
| EXAM ID | B-234 |
| SCORES OF RESPECTIVE SUBJECTS | SUBJECT 1 | 69 |
| | SUBJECT 2 | 89 |
| | SUBJECT 3 | 90 |
| | SUBJECT 4 | 80 |
| | SUBJECT 5 | 74 |
| TOTAL SCORE | 402 |

FIG. 11D

| NAME | USER U1 | FIRST PORTION |
|---|---|---|
| SEX | MALE | |
| DATE OF BIRTH | APRIL 20, 1980 | |
| AGE | 37 | |
| LICENSE NUMBER | 123456789 | |
| EXAM ID | A-123 | SECOND PORTION |
| SCORES OF RESPECTIVE SUBJECTS — SUBJECT 2 | 84 | |
| SCORES OF RESPECTIVE SUBJECTS — SUBJECT 3 | 88 | |
| SCORES OF RESPECTIVE SUBJECTS — SUBJECT 4 | 72 | |
| EXAM ID | B-234 | THIRD PORTION |
| SCORES OF RESPECTIVE SUBJECTS — SUBJECT 2 | 89 | |
| SCORES OF RESPECTIVE SUBJECTS — SUBJECT 3 | 90 | |
| SCORES OF RESPECTIVE SUBJECTS — SUBJECT 4 | 80 | |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/026920 filed on Jul. 18, 2018, which claims priority benefit of Japanese Patent Application No. JP 2017-177085 filed in the Japan Patent Office on Sep. 14, 2017. Each of the above-referenced applications is hereby incorporated herein by reference in its entirety.

TECHNICAL FIELD

The present disclosure relates to an information processing apparatus, an information processing method, and a program.

BACKGROUND ART

In recent years, services each using a peer-to-peer database such as blockchain data disclosed in Non-Patent Document 1 below have been actively developed. Bitcoin disclosed in Non-Patent Document 2 below or the like can be cited as an example, Bitcoin using blockchain data for exchange of virtual currency.

A service that uses a peer-to-peer database, such as blockchain data, prevents falsification or the like of data managed in the peer-to-peer database (hereinafter referred to as "management data" in some cases), and can ensure authenticity of the management data.

CITATION LIST

Non-Patent Document

Non-Patent Document 1: Melanie Swan, "Blockchain", (U.S.), O'Reilly Media, 2015 Jan. 22
Non-Patent Document 2: Andreas M. Antonopoulos, "Mastering Bitcoin", (U.S.), O'Reilly Media, 2014 Dec. 1

SUMMARY OF THE INVENTION

Problems to be Solved by the Invention

However, there have been cases where a user himself/herself who is the owner of the management data is difficult to disclose data to the peer-to-peer database while maintaining authenticity of the data. For example, in a case where the user himself/herself who is the owner of the management data of the peer-to-peer database extracts desired pieces of data from the management data and reconstructs the extracted data as data to be disclosed (hereinafter referred to as "public data"), there is a possibility that erroneous data is included unintentionally, or the malicious user intentionally falsifies the data at the stage of reconstruction.

Therefore, the present disclosure has been made in view of the problems described above, and the purpose of the present disclosure is to provide a novel and improved information processing apparatus, a novel and improved information processing method, and a novel and improved program that enable a user himself/herself who is the owner of management data of a peer-to-peer database to disclose the data while maintaining authenticity of the data.

Solution to Problems

According to the present disclosure, an information processing apparatus is provided including a creation unit that creates public data by using management data of a P2P database, and a registration control unit that controls registration of the public data to the P2P database, on the basis of first identification information that uniquely identifies the management data.

In addition, according to the present disclosure, an information processing method executed by a computer is provided, the method including creating public data by using management data of a P2P database, and controlling registration of the public data to the P2P database, on the basis of first identification information that uniquely identifies the management data.

Furthermore, according to the present disclosure, a program is provided, the program causing a computer to create public data by using management data of a P2P database, and to control registration of the public data to the P2P database, on the basis of first identification information that uniquely identifies the management data.

Effects of the Invention

As described above, according to the present disclosure, a user himself/herself who is the owner of management data of the peer-to-peer database can disclose data while maintaining authenticity of the data.

Note that the effects described above are not necessarily limited, and, along with or in lieu of the effects described above, any of the effects described in the present Description, or another effect that can be grasped from the present Description may be exhibited.

BRIEF DESCRIPTION OF DRAWINGS

FIG. 5 is a block diagram illustrating a functional configuration example of a user apparatus 100 according to the first embodiment of the present disclosure.
FIG. 6A is a diagram illustrating a specific example of management data and public data according to the first embodiment of the present disclosure.
FIG. 6B is a diagram illustrating a specific example of the management data and the public data according to the first embodiment of the present disclosure.
FIG. 6C is a diagram illustrating a specific example of the management data and the public data according to the first embodiment of the present disclosure.
FIG. 6D is a diagram illustrating a specific example of the management data and the public data according to the first embodiment of the present disclosure.
FIG. 7 is a block diagram illustrating a functional configuration example of a node apparatus 200 according to the first embodiment of the present disclosure.

FIG. 11A is a diagram illustrating a specific example of management data and public data according to modification of the present disclosure.

FIG. 11B is a diagram illustrating a specific example of the management data and the public data according to the modification of the present disclosure.

FIG. 11C is a diagram illustrating a specific example of the management data and the public data according to the modification of the present disclosure.

FIG. 11D is a diagram illustrating a specific example of the management data and the public data according to the modification of the present disclosure.

MODE FOR CARRYING OUT THE INVENTION

Figure 1:
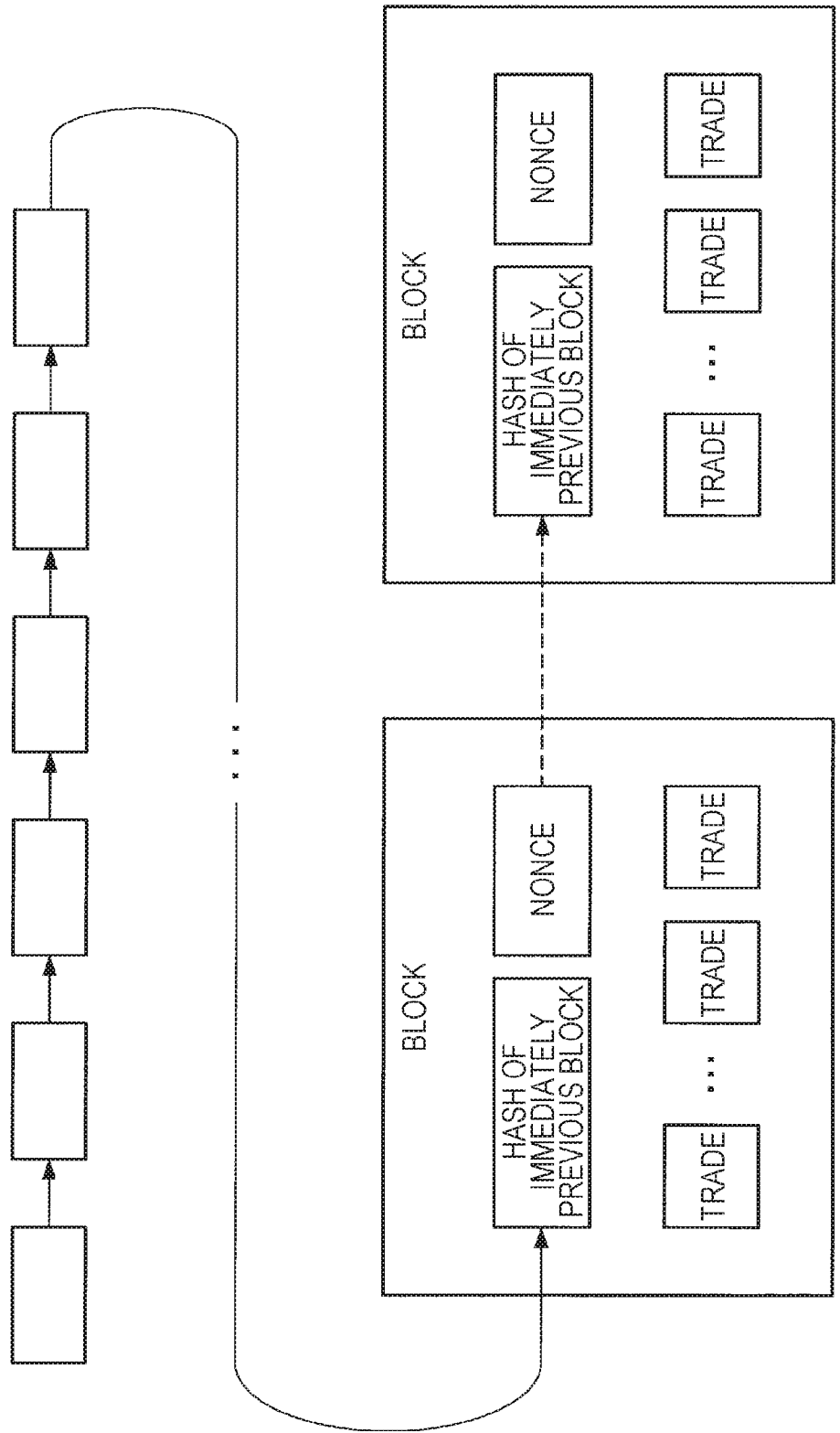
FIG. 1 is a diagram illustrating an outline of blockchain data which is one type of a peer-to-peer database.

Hereinafter, preferred embodiments of the present disclosure will be described in detail with reference to the accompanying drawings. Note that in the present Description and the drawings, the same reference signs denote constituents having substantially the same functional configuration and an overlapping description will be omitted.

Note that the description will be given in the following order.
1. Overview of peer-to-peer database
2. First embodiment
2.1. Overview
2.2. System configuration example
2.3. Functional configuration example of user apparatus 100
2.4. Functional configuration example of node apparatus 200
2.5. Process flow
3. Second embodiment
4. Modification
5. Hardware configuration example
6. Summary 1. Overview of Peer-To-Peer Database Before describing an embodiment of the present disclosure, first, an overview of a peer-to-peer database will be described.

In an information processing system according to the present embodiment, a distributed peer-to-peer database distributed in a peer-to-peer network is used. Note that the peer-to-peer network is also referred to as a peer-to-peer distributed file system in some cases. Hereinafter, the peer-to-peer network is referred to as a "P2P network" and the peer-to-peer database is referred to as a "P2P database" in some cases. As an example of the P2P database, blockchain data distributed in a P2P network is used in some cases. Therefore, first, an outline of a blockchain system will be described as an example.

As illustrated in FIG. 1, blockchain data is data including a plurality of blocks connected like a chain. In each block, one or two or more pieces of target data can be stored as a transaction or transactions (trade or trades).

Blockchain data used for exchanging virtual currency data such as Bitcoin or the like can be cited as an example of the block chain data. The blockchain data used for exchanging virtual currency data includes, for example, a hash of the immediately previous block and a value called a nonce. The hash of the immediately previous block is information used to determine whether or not the block is a "correct block" that is correctly connected to the immediately previous block. The nonce is information used for preventing spoofing in authentication using a hash, and falsification is prevented by using the nonce. A character string, a numeric string, data indicating a combination thereof, or the like can be cited as an example of the nonce.

In addition, in the blockchain data, data of each transaction is given an electronic signature using a cryptographic key or is encrypted by using a cryptographic key. Furthermore, data of each transaction is disclosed and shared throughout the P2P network.

Figure 2:
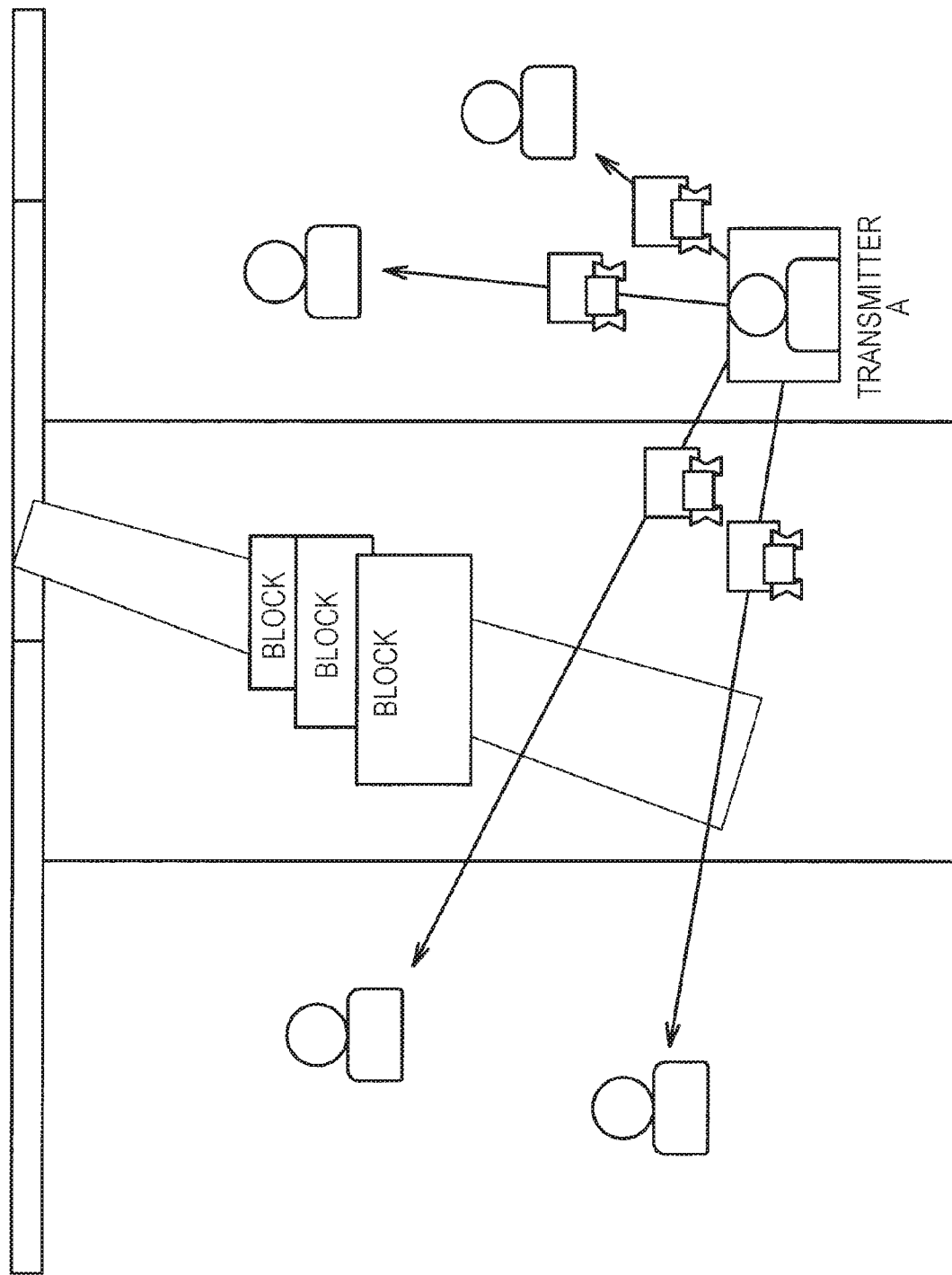
FIG. 2 is a diagram illustrating an outline of blockchain data which is one type of the peer-to-peer database.

FIG. 2 is a diagram illustrating a state in which target data is registered by a user A in the blockchain system. The user A electronically signs the target data to be registered to the blockchain data by using a private key of the user A. Then, the user A broadcasts a transaction including the electronically signed target data on the P2P network. As a result, it is ensured that the owner of the target data is the user A.

Figure 3:
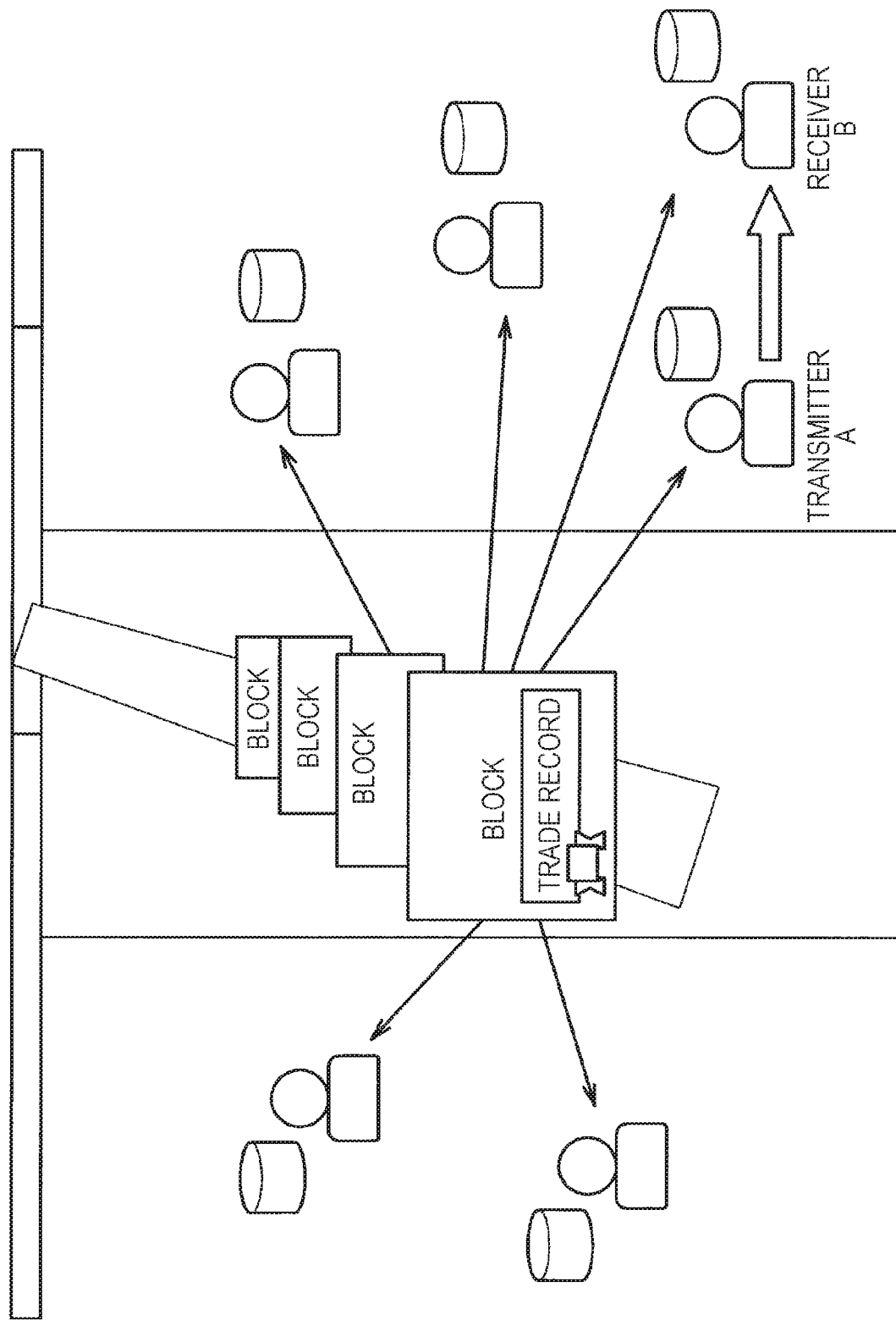
FIG. 3 is a diagram illustrating an outline of blockchain data which is one type of the peer-to-peer database.

FIG. 3 is a diagram illustrating a state in which target data is transferred from the user A to a user B in the blockchain system. The user A electronically signs the transaction by using the private key of the user A, and makes the transaction include a public key of the user B. Therefore, it is indicated that the target data has been transferred from the user A to the user B. Furthermore, the user B may acquire the public key of the user A from the user A and acquire the electronically signed or encrypted target data, upon trading of the target data.

Furthermore, in the blockchain system, for example, by using a sidechain technology, it is possible to make blockchain data used for exchanging existing virtual currency data include other target data different from virtual currency. An example of the blockchain data is Bitcoin blockchain data.

2. First Embodiment

The overview of the peer-to-peer database has been described above. Subsequently, a first embodiment according to the present disclosure will be described.

2.1. Overview

First, an outline of the first embodiment will be described.

As described above, the information processing system that manages data by using a P2P database such as blockchain data can prevent falsification or the like of data and can ensure authenticity of the data. However, there have been cases where a user himself/herself who is the owner of management data of the P2P database is difficult to disclose data while maintaining authenticity of the data. For example, in a case where a user himself/herself who is the owner of the management data of the P2P database extracts desired pieces of data from the management data and reconstructs the extracted data as public data, there is a possibility that erroneous data is included unintentionally, or the malicious user intentionally falsifies the data, at the stage of reconstruction. In other words, a viewer of public data cannot easily determine whether or not the public data is authentic.

Note that if the user provides a viewer with identification information of the management data (original data) of the P2P database (for example, a TXID or the like in blockchain data which is one type of the P2P database), it is technically possible for the viewer to check the original data registered to the P2P database by using the identification information and to check authenticity of the data reconstructed on the basis of the original data. However, in this case, since entirety of the original data is disclosed, even the data that the user does not want to disclose (or that should not be disclosed) is viewed by a viewer. Furthermore, the larger the number of pieces of original data, the greater the workload of checking performed by a viewer. For example, in a case where public data is created by reconstructing tens to thousands of pieces of original data, the workload of checking authenticity by comparing the original data with the public data is great.

From the above, authenticity of only the management data itself of the P2P database is ensured by the P2P database. In some cases, it is difficult for the user to ensure authenticity of public data created by reconstructing the management data even though the user is the owner of the public data.

In view of the circumstances described above, the disclosing party of the present case has created the present disclosure. In the information processing system according to the present disclosure, the user himself/herself who is the owner of the management data of the P2P database can disclose data while maintaining authenticity thereof. More specifically, the user can create public data by reconstructing the management data of the P2P database, and can disclose the public data while maintaining authenticity thereof. Furthermore, since the public data does not include information that can identify the user, the user can disclose the public data anonymously.

Note that the present disclosure may be applied to any system, apparatus, service, and the like as long as a P2P database is used. Hereinafter, a case where the present disclosure is applied to an information processing system that provides a learning achievement and activity recording service will be described. Here, the learning achievement and activity recording service is a service through which each educational institution (for example, a nursery school, a kindergarten, an elementary school, a junior high school, a high school, a university, a graduate school, a learning cram school, a cramming school, a license school, or the like) registers a learning achievement record (for example, a record regarding an exam result, obtained credits, an obtained qualification, or the like) of a student, an activity record (for example, a record regarding club activities, student council activities, an attendance status, or the like) of the student, and the like to the P2P database and manages them. As a result, authenticity of the learning achievement record and activity record of the student is ensured. The service can be used, for example, in a case where a user submits information associated with an exam result, obtained credits, and the like to a school whose entrance exam the user intends to take, a company at which the user is going to work, or the like. Note that content of the learning achievement and activity recording service is not limited to the above. For example, the learning achievement and activity recording service may be used by an institution other than an educational institution, and a record regarding the social experience, the work history, or the like of a target person may be registered to the P2P database and may be managed.

2.2. System Configuration Example

The outline of the first embodiment has been described above. Subsequently, with reference to FIG. 4, a configuration example of an information processing system according to the present embodiment will be described.

Figure 4:
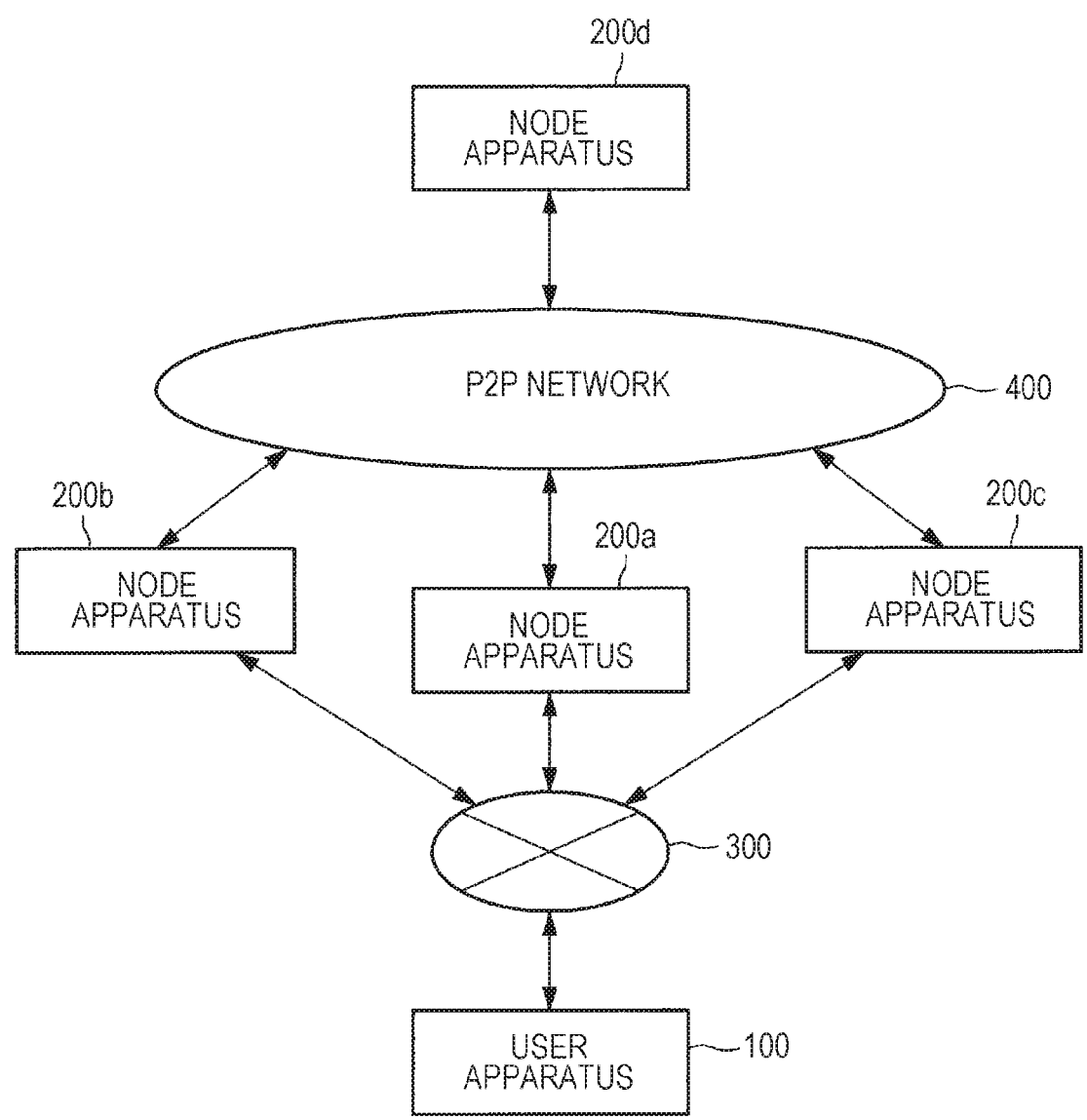
FIG. 4 is a diagram illustrating a configuration example of an information processing system according to a first embodiment of the present disclosure.

As illustrated in FIG. 4, the information processing system according to the present embodiment includes a user apparatus 100 and a plurality of node apparatuses 200 (node apparatuses 200a to 200d in FIG. 4). Furthermore, each of the plurality of node apparatuses 200 is connected to a P2P network 400. Moreover, the user apparatus 100 and a plurality of node apparatuses 200 (node apparatuses 200a to 200c in FIG. 4) are connected by a network 300. Note that the configuration of the information processing system according to the present embodiment is not limited to the configuration of FIG. 4. For example, the number of each of the apparatuses included in the information processing system may be changed as appropriate.

User Apparatus 100

The user apparatus 100 is an information processing apparatus that creates public data by reconstructing management data in the P2P database. More specifically, the user apparatus 100 acquires management data of the P2P database and identification information that uniquely identifies the management data (hereinafter, referred to as "first identification information" in some cases) from the node apparatus 200. Then, the user apparatus 100 creates public data by reconstructing the management data on the basis of a request from the user, and requests the node apparatus 200 to register the public data and the first identification information in association with each other to the P2P database. As a result, the user can create public data by reconstructing the management data of the P2P database, and can disclose the public data while maintaining authenticity thereof.

Note that as long as the management data of the P2P database is consistent with the public data, the data reconstruction method is not particularly limited. For example, the user may create public data by deleting part of the management data. For example, in a case where there is management data related to a plurality of scores of an exam provided by a certain business operator (for example, a business operator that operates the node apparatus 200a), the user may delete some of the plurality of scores to create public data.

Furthermore, the user may create public data by integrating a plurality of pieces of management data. For example, in a case where there is management data related to scores of exams provided by a plurality of business operators, respectively (for example, a business operator that operates the node apparatus 200a and a business operator that operates the node apparatus 200b), the user may integrate the scores of the exams provided by the respective business operators to create public data.

Furthermore, the user may make the public data include content not included in the management data. For example, the user may appropriately add a comment or the like not included in the management data to the management data regarding an exam score. At this time, in the public data, data not included in the management data is distinguished from the data included in the management data by a predetermined method (for example, the storage area is distinguished) and is handled as out of the scope of authenticity guarantee.

In addition, the user may not perform a task of deleting part of management data itself or integrating a plurality of pieces of management data themselves, but may add, to a completely different data file or the like, reconstructed data obtained by deleting part of management data or integrating a plurality of pieces of management data to create public data.

Note that the user may reconstruct the data described above by executing any data editing program or the like held in the user apparatus 100, or may reconstruct the data by using an any external service (for example, a service provided by a business operator that operates the node apparatus 200c). Furthermore, the user may set any access right for public data. For example, the user may set an access right such as "Readable", "Unreadable", or the like with respect to the entire public data or each piece of data included in the public data. A specific example of data reconstruction will be described later.

Furthermore, the first identification information (identification information that uniquely identifies management data) may be, for example, a TXID in blockchain data, a hash value of management data, or the like; however, is not limited to them, and may be any information as long as the information can uniquely identify management data. For example, the first identification information may be a combination of an ID or the like of any business operator, an ID or the like of a service provided by the business operator, and an ID or the like (or data item or the like) of data managed by the service. For example, "A-123-456" (or "A-123-total score" or the like) obtained by combining a business operator ID "A", a service ID "123" provided by the business operator, and a service ID "456" managed by the service (or the data item "total score", or the like) may be used as first identification information.

Furthermore, management data described above may be any data as long as the data can be specified by the first identification information and is registered to the P2P database. For example, if any file is registered to the P2P database and the file can be specified by the first identification information, it can be said that the file is management data. Furthermore, if respective pieces of data stored in a file can be specified by pieces of first identification information different from each other, it can be said that the respective pieces of data stored in the file are also management data.

Note that the user apparatus 100 is also an information processing apparatus used by a viewer of public data. More specifically, on the basis of a request from a viewer, the user apparatus 100 acquires data to be viewed from the P2P database and provides the data to the viewer. As a result, the viewer can view public data.

Furthermore, the type of the user apparatus 100 is not particularly limited. For example, the user apparatus 100 may be any information processing apparatus such as a general-purpose computer, a personal computer (PC), a tablet PC, a smartphone, a portable game device, a media player, a digital camera, a digital video camera, or the like.

Node Apparatus 200

The node apparatus 200 is an information processing apparatus that is connected to the P2P network 400 and has a P2P database. Then, the node apparatus 200 can perform a process for registering data to the P2P database, a process for acquiring data from the P2P database, and the like.

The process for registering data to the P2P database will be described more specifically. As described above, the node apparatus 200 registers to the P2P database, public data created by the user apparatus 100 and the first identification information in association with each other. At that time, the node apparatus 200 acquires management data specified by the first identification information from the P2P database, and checks consistency between the management data and the public data. Then, in a case where the management data and the public data are consistent with each other, the node apparatus 200 registers the public data to the P2P database. In other words, for example, in a case where the user falsifies the data upon creation of public data, the public data is not consistent with the management data and therefore is not registered to the P2P database. As a result, the user can disclose the public data while maintaining authenticity thereof. Note that the first identification information is information that uniquely identifies management data but cannot specify the user. Therefore, the user can disclose public data anonymously by using the method described above. The case where the node apparatus 200 registers data to the P2P database is not limited to this.

Furthermore, the process for acquiring data from the P2P database will be described in more specifically. In a case where a viewer requests a public data acquisition process, the node apparatus 200 acquires the public data from the P2P database and provides the public data to the viewer. As a result, the viewer can view the public data. Note that the case where the node apparatus 200 acquires data in the P2P database is not limited to this.

Note that in a case where the node apparatus 200 performs the process for registering data to the P2P database, the process for acquiring data from the P2P database, or the like, the node apparatus 200 uses a program (for example, a chain code or the like) basically provided in the P2P database and executed on the P2P database. By using the program, for example, various processes other than a trade of virtual currency such as Bitcoin are realized according to a predetermined rule. Hereinafter, a predetermined program provided in the P2P database and executed on the P2P database is referred to as a "P2P database program". Note that the node apparatus 200 may realize these processes by using a program other than the P2P database program as appropriate.

Furthermore, in the present embodiment, an example in which the plurality of node apparatuses 200 has the same function will be described. However, node apparatuses 200 may have functions different from each other. For example, a node apparatus 200 (for example, an endorsing peer, or the like) that approves registration of data (transaction) to the P2P database, a node apparatus 200 (for example, an ordering peer, or the like) that instructs each node apparatus 200 to register the data after approval, a node apparatus 200 (for example, a committing peer, or the like) that registers the data in the P2P database may be provided. Note that similarly to the user apparatus 100, the type of the node apparatus 200 is not particularly limited.

P2P Network 400

The P2P network 400 is a network in which a P2P database is distributed. As described above, by connecting each node apparatus 200 to the P2P network 400, each node apparatus 200 can update the P2P database while maintaining consistency with the P2P databases held by the other node apparatuses 200.

Note that the type of the P2P network 400 is not particularly limited. For example, the type of the P2P network 400 may be any of a consortium type operated by a plurality of organizations, a private type operated by a single organization, or a public type that does not specifically limit participants.

Note that the communication system, the type of channel, and the like used for the P2P network 400 are not particularly limited. For example, the P2P network 400 may be realized by a dedicated channel network such as an Internet protocol-virtual private network (IP-VPN). Furthermore, the P2P network 400 is realized by a public network such as the Internet, a telephone network, a satellite communication network, various local area networks (LANs) including Ethernet (registered trademark), a wide area network (WAN), or the like. Moreover, the P2P network 400 may be realized by a wireless communication network such as Wi-Fi (registered trademark), Bluetooth (registered trademark), or the like.

Network 300

The network 300 is a network that connects the node apparatus 200 and the user apparatus 100. Note that similarly to the P2P network 400, the communication system, the type of channel, and the like used for the network 300 are not particularly limited.

A configuration example of the information processing system according to the present embodiment has been described above. Note that the configuration described above with reference to FIG. 4 is only an example, and the configuration of the information processing system according to the present embodiment is not limited to such an example. For example, the node apparatus 200 may have the function of the user apparatus 100. For example, a program that provides the function of the user apparatus 100 may be executed on the node apparatus 200. Furthermore, the user apparatus 100 may have the function of the node apparatus 200. In other words, the user apparatus 100 may participate in the P2P network 400 and have a P2P database. The configuration of the information processing system according to the present embodiment can be flexibly modified according to specifications and operations.

2.3. Functional Configuration Example of User Apparatus 100

A configuration example of the information processing system according to the present embodiment has been described above. Subsequently, a functional configuration example of the user apparatus 100 will be described with reference to FIG. 5.

As illustrated in FIG. 5, the user apparatus 100 includes a control unit 110, an input unit 120, an output unit 130, a storage unit 140, and a communication unit 150. Furthermore, the control unit 110 includes a creation control unit 111 and a registration control unit 112.

Control Unit 110

The control unit 110 has a functional configuration of comprehensively controlling the overall processes performed by the user apparatus 100. For example, the control unit 110 can control start and stop of each configuration on the basis of input performed by the user using the input unit 120, control information from an external apparatus received via the communication unit 150, or the like, and can control the output unit 130 such as a display, a speaker, or the like. Note that the control content of the control unit 110 is not limited to them. For example, the control unit 110 may control processes generally performed in a general-purpose computer, a PC, a tablet PC, or the like.

Creation Control Unit 111

The creation control unit 111 has a functional configuration of controlling creation of public data on the basis of a request from the user. More specifically, the creation control unit 111 functions as a creation unit that creates public data by reconstituting management data in the P2P database on the basis of a request from the user. As described above, the data reconstruction method is not particularly limited. For example, the creation control unit 111 deletes part of management data, integrates a plurality of pieces of management data, or add content not included in management data to create public data. Furthermore, as described above, the creation control unit 111 may realize reconstruction of data by executing any data editing program or the like held in the user apparatus 100, or may realize reconstruction of data by using any external service. Furthermore, the creation control unit 111 may set any access right for public data. For example, on the basis of a request from the user, the creation control unit 111 may set an access right such as "Readable", "Unreadable", or the like with respect to the entire public data or each piece of data included in the public data.

Here, a specific example of data reconstruction performed by the creation control unit 111 will be described with reference to FIGS. 6A, 6B, 6C, and 6D. FIGS. 6A, 6B, 6C, and 6D illustrate a specific example of data reconstruction in a case where management data of the P2P database is an exam score as an example.

First, assume that the data illustrated in FIG. 6A is registered to the P2P database as management data. More specifically, the management data includes "name", "sex", "date of birth", "age", "address", "phone number", "academic background", "exam ID", "scores of respective subjects", "total score" and the like. Then, first identification information of the management data is "exam ID: A-123". In other words, the management data described above is uniquely specified by "exam ID: A-123".

Then, the creation control unit 111 can create public data by deleting part of the management data, on the basis of a request from the user. For example, the creation control unit 111 can create public data as illustrated in FIG. 6B by deleting "address", "phone number", "academic background", "subject 1", "subject 5", and "total score" which are the highlighted portions in FIG. 6A.

At that time, as described above, the public data is associated with the first identification information. In the example illustrated in FIG. 6B, the public data is associated with the first identification information by storing the first identification information "exam ID: A-123". Note that this is only an example, and public data may be associated with the first identification information by any method other than storing first identification information.

Furthermore, assume that management data illustrated in FIG. 6C exists as management data different from the management data illustrated in FIG. 6A. Then, the creation control unit 111 can create public data by integrating the management data illustrated in FIG. 6A and the management data illustrated in FIG. 6C. For example, public data as illustrated in FIG. 6D can be created by integrating pieces of data from which "address", "phone number", "academic background", "subject 1", "subject 5", and "total score" which are the highlighted portions in FIGS. 6A and 6C are deleted. In a case where public data is created by integrating a plurality of pieces of management data, portions of the public data corresponding to the pieces of management data are associated with pieces of first identification information, respectively. For example, since the second portion illustrated in FIG. 6D is the portion of the management data illustrated in FIG. 6A, the second portion is associated with the first identification information "exam ID: A-123" of the management data illustrated in FIG. 6A. Furthermore, since the third portion is the portion of the management data illustrated in FIG. 6C, the third portion is associated with the first identification information "exam ID: B-234" of the management data illustrated in FIG. 6C. Note that since the first portion is the portion common to both the management data illustrated in FIG. 6A and the management data illustrated in FIG. 6C, the first portion is associated with both of the pieces of the first identification information.

Registration Control Unit 112

The registration control unit 112 has a functional configuration of controlling registration of public data to the P2P database. More specifically, the registration control unit 112 creates request information requesting registration of the public data as illustrated in FIG. 6B or 6D to the P2P database, the public data having been created by the creation control unit 111, and provides the request information to the node apparatus 200. An example in which the first identification information is stored in the public data has been described above. However, the registration control unit 112 may associate public data created by the creation control unit 111 with first identification information by any method. For example, the registration control unit 112 may create request information for requesting public data and first identification information to be registered to the P2P database in association with each other, and may provide the request information to the node apparatus 200.

Input Unit 120

The input unit 120 has a functional configuration of receiving input from the user. For example, the input unit 120 includes input means such as a mouse, a keyboard, a touch panel, a button, a switch, or a microphone, and the user can perform input regarding data reconstruction and the like by using these input means. Furthermore, by using these input means, a viewer can perform input regarding acquisition or the like of data to be viewed from the P2P database. The input unit 120 provides the input data to the control unit 110. Note that the input means that the input unit 120 includes is not particularly limited.

Output Unit 130

The output unit 130 has a functional configuration of outputting various types of data. For example, the output unit 130 includes display means such as a display, audio output means such as a speaker, or the like, and can perform output related to data reconstruction or the like on the basis of control performed by the control unit 110. Furthermore, on the basis of control performed by the control unit 110, the output unit 130 can output data acquired from the P2P database. Note that the output means that the output unit 130 includes is not particularly limited.

Storage Unit 140

The storage unit 140 has a functional configuration of storing various types of information. For example, the storage unit 140 stores management data of the P2P database, public data reconstructed on the basis of the management data, or the like, and stores a program, a parameter, or the like used by each functional configuration of the user apparatus 100. Note that information stored in the storage unit 140 is not limited to them.

Communication Unit 150

The communication unit 150 controls various types of communication with the node apparatus 200. For example, the communication unit 150 receives, for example, management data of the P2P database from the node apparatus 200, or transmits, for example, public data reconstructed on the basis of the management data to the node apparatus 200. Note that the communication content of the communication unit 150 is not limited to them.

A functional configuration example of the user apparatus 100 has been described above. Note that the functional configuration described above with reference to FIG. 5 is only an example, and the functional configuration of the user apparatus 100 is not limited to such an example. For example, the user apparatus 100 does not necessarily have all the configurations illustrated in FIG. 5. Furthermore, the functional configuration of the user apparatus 100 can be flexibly modified according to specifications and operations.

2.4. Functional Configuration Example of Node Apparatus 200

A functional configuration example of the user apparatus 100 has been described above. Subsequently, a functional configuration example of the node apparatus 200 will be described with reference to FIG. 7.

As illustrated in FIG. 7, the node apparatus 200 includes a control unit 210, a storage unit 220, and a communication unit 230. In addition, the control unit 210 includes a registration control unit 211 and an acquisition control unit 212. Furthermore, the storage unit 220 includes a P2P database 221, and a P2P database program 222 is provided in the P2P database 221.

Control Unit 210

The control unit 210 has a functional configuration of comprehensively controlling the overall processes performed by the node apparatus 200. For example, the control unit 210 can control start and stop of each configuration, and can control, for example, an output unit (not illustrated) such as a display, a speaker, or the like by creating a control signal. Note that the control content of the control unit 210 is not limited to them. For example, the control unit 210 may control processes generally performed in a general-purpose computer, a PC, a tablet PC, or the like.

Registration Control Unit 211

The registration control unit 211 has a functional configuration of controlling registration of data to the P2P database 221. For example, in a case where request information requesting registration of public data to the P2P database 221 is provided from the user apparatus 100, the registration control unit 211 controls registration of the public data to the P2P database 221. More specifically, the registration control unit 211 acquires management data specified by first identification information from the P2P database 221, and checks whether or not the management data and the public data are consistent with each other. Then, in a case where the management data and the public data are consistent with each other, the registration control unit 211 registers the public data to the P2P database 221. Note that the registration control unit 211 performs the process described above by executing the P2P database program 222. Furthermore, the case where the registration control unit 211 registers data to the P2P database 221 is not limited to this.

Acquisition Control Unit 212

The acquisition control unit 212 has a functional configuration of controlling acquisition of data from the P2P database 221. For example, in a case where a viewer requests the public data acquisition process, the acquisition control unit 212 acquires public data from the P2P database 221 by using identification information of the public data, and provides the public data to the viewer. Note that the acquisition control unit 212 performs this process by executing the P2P database program 222. Furthermore, the case where the acquisition control unit 212 acquires data from the P2P database 221 is not limited to this.

Storage Unit 220

The storage unit 220 has a functional configuration of storing various types of information. For example, the storage unit 220 stores a program, a parameter, or the like used by each functional configuration of the node apparatus 200. Note that the information stored in the storage unit 220 is not limited to them.

P2P Database 221

The P2P database 221 is a database commonly held by the respective node apparatuses 200, and is, for example, blockchain data. As described above, a learning achievement record (for example, a record regarding an exam result, obtained credits, an obtained qualification, or the like) of a student, an activity record (for example, a record regarding club activities, student council activities, an attendance status, or the like) of the student, data check history and the like are registered to the P2P database 221. Various types of information registered to the P2P database 221 may be given an electronic signature using a cryptographic key, or may be encrypted by using a cryptographic key. Note that the information registered to the P2P database 221 is not limited to them.

P2P Database Program 222

The P2P database program 222 is a predetermined program (for example, a chain code or the like) provided in the P2P database 221 and executed on the P2P database 221. By using the P2P database program 222, for example, various processes other than a trade of virtual currency such as Bitcoin are realized in a consistent manner according to a predetermined rule.

The P2P database program 222 can realize overall processes performed on the P2P database 221. For example, the P2P database program 222 can realize a public data registration process, the public data acquisition process, and the like performed by accessing the P2P database 221. The public data registration process will be described more specifically. The P2P database program 222 acquires management data specified by first identification information associated with the public data from the P2P database 221, and checks consistency between the management data and the public data. Then, in a case where the management data and the public data are consistent with each other, the P2P database program 222 registers the public data to the P2P database 221.

Note that the processes realized by the P2P database program 222 are not limited to them. Furthermore, the development language of the P2P database program 222, the number or the like of P2P database programs 222 provided on the P2P database 221, or the like is not particularly limited.

Communication Unit 230

The communication unit 230 has a functional configuration of controlling various communications with the user apparatus 100 and another node apparatus 200. For example, in communication with the user apparatus 100, the communication unit 230 transmits, for example, management data of the P2P database 221, and receives, for example, request information requesting registration of public data reconstructed on the basis of the management data to the P2P database 221. Furthermore, in communication with another node apparatus 200, the communication unit 230 transmits and receives, for example, information used for agreement formation (also referred to as "consensus") for updating the P2P database 221. Note that the communication content of the communication unit 230 is not limited to them.

A functional configuration example of the node apparatus 200 has been described above. Note that the functional configuration described above with reference to FIG. 7 is only an example, and the functional configuration of the node apparatus 200 is not limited to such an example. For example, the node apparatus 200 does not necessarily have all of the configurations illustrated in FIG. 7. Furthermore, the functional configuration of the node apparatus 200 can be flexibly modified according to specifications or operations.

2.5. Process Flow

Figure 8:
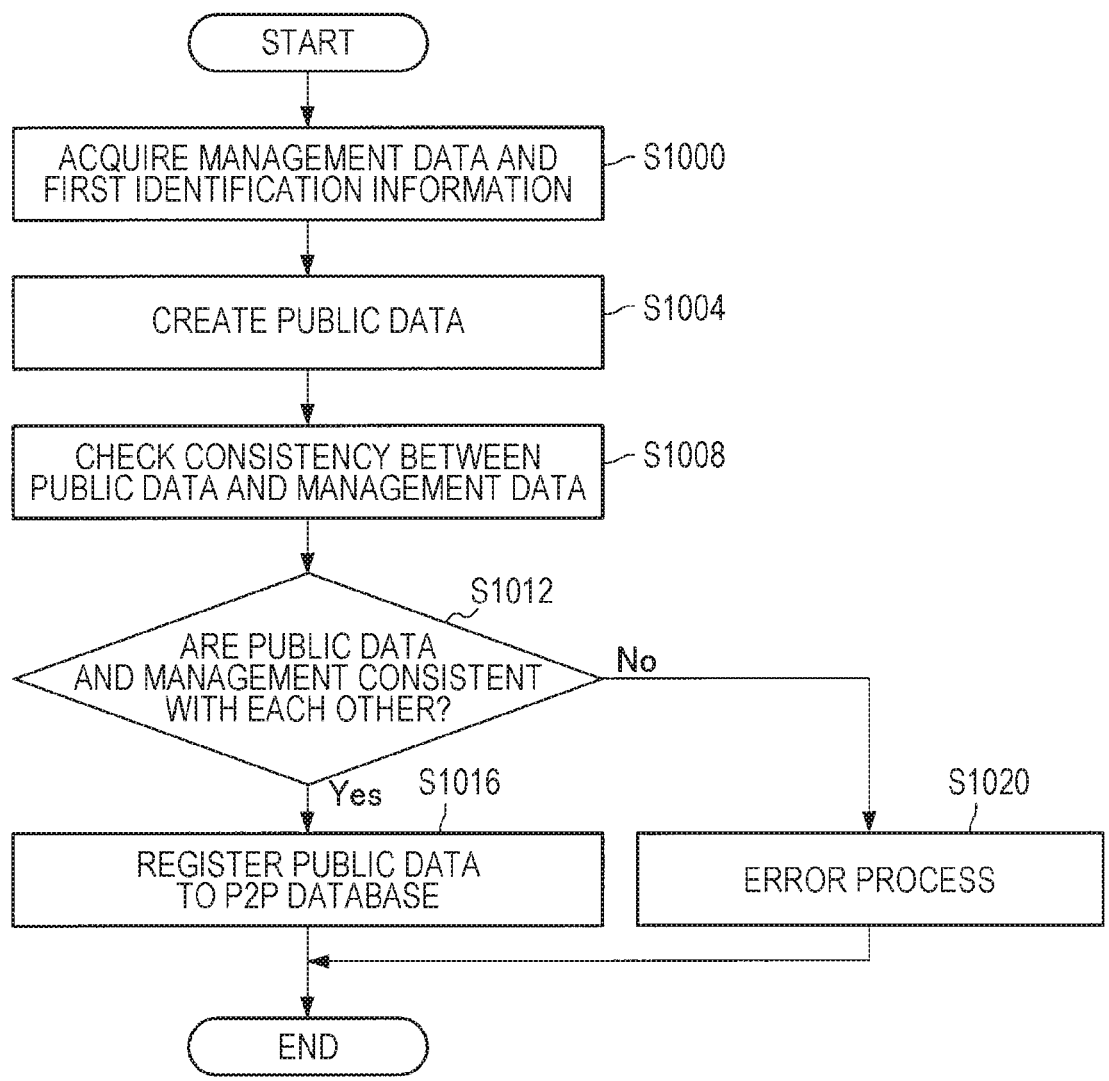
FIG. 8 is a flowchart illustrating a process flow of each apparatus according to the first embodiment of the present disclosure.

A functional configuration example of the node apparatus 200 has been described above. Subsequently, the process flow of the user apparatus 100 and the node apparatus 200 will be described with reference to FIG. 8. FIG. 8 illustrates an example of the process flow for registering public data to the P2P database 221.

In step S1000, the user apparatus 100 acquires management data and first identification information of the P2P database 221 from the node apparatus 200. In step S1004, on the basis of a request from the user, the creation control unit 111 of the user apparatus 100 creates public data by reconstituting the management data in the P2P database 221. For example, the creation control unit 111 deletes part of management data, integrates a plurality of pieces of management data, or add content not included in management data to create public data.

Thereafter, the public data registration process is performed. More specifically, the registration control unit 112 provides to the node apparatus 200 request information requesting registration of the public data to the P2P database 221, the public data having been created by the creation control unit 111. Then, in step S1008, the registration control unit 211 of the node apparatus 200 executes the P2P database program 222 to check whether or not the public data and the management data are consistent with each other. In a case where the public data and the management data are consistent with each other (step S1012/Yes), the registration control unit 211 registers the public data to the P2P database 221 in step S1016, and thus a series of processes end. In a case where the public data and the management data are not consistent with each other (step S1012/No), a predetermined error process is performed in step S1020, and thus a series of processes ends. For example, the registration control unit 211 provides an error signal to the user apparatus 100 so as to notify the user of failure of the registration process of the public data to the P2P database 221. Note that content of the predetermined error process is not limited to this.

Note that the respective steps in the flowchart in FIG. 8 do not necessarily have to be processed in time series in the order described in the flowchart. That is, the respective steps in the flowchart may be processed in an order different from the order described in the flowchart, or may be processed in parallel.

3. Second Embodiment

The first embodiment according to the present disclosure has been described above. Subsequently, a second embodiment according to the present disclosure will be described.

In the first embodiment, in a case where the P2P database program 222 (for example, a chain code or the like) checks consistency between the management data of the P2P database 221 and the public data, and registers the public data to the P2P database 221 in a case where the consistency is confirmed. Therefore, authenticity of the public data is ensured.

In contrast, in the second embodiment, the person who created management data of a P2P database 221 (hereinafter referred to as "management data creator") approves public data. Therefore, authenticity of the public data is ensured. More specifically, in the second embodiment, if a registration control unit 112 of a user apparatus 100 provides to a node apparatus 200 request information requesting registration of public data to the P2P database 221, a registration control unit 211 of a node apparatus 200 registers the public data to the P2P database 221.

Figure 9:
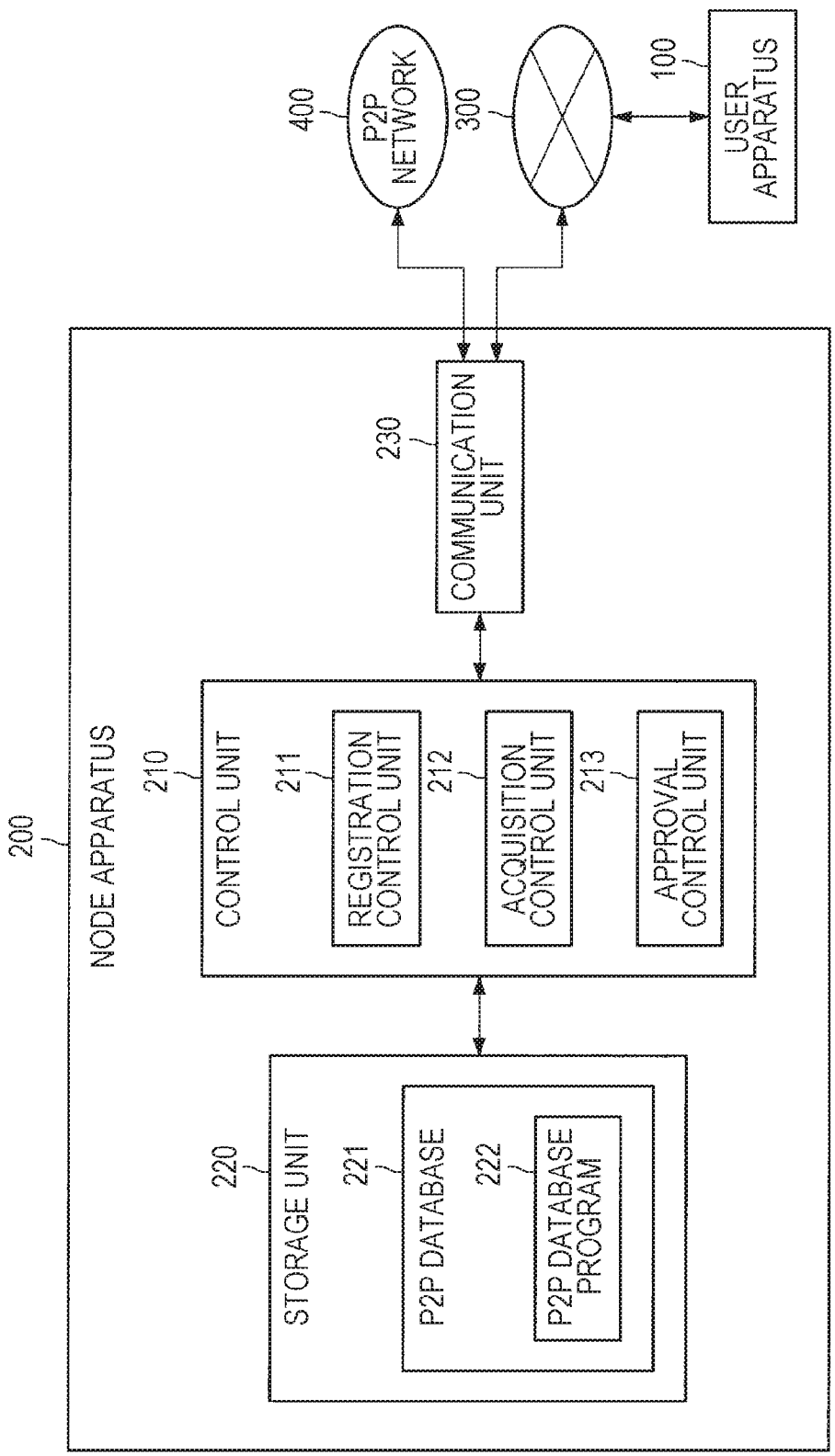
FIG. 9 is a block diagram illustrating a functional configuration example of a node apparatus 200 according to a second embodiment of the present disclosure.

Here, as illustrated in FIG. 9, a control unit 210 of the node apparatus 200 according to the second embodiment includes an approval control unit 213, and the management data creator uses the approval control unit 213 to approve consistency between public data and management data. More specifically, the registration control unit 211 registers the public data to the P2P database 221 as described above, and then provides to the approval control unit 213 first identification information associated with the public data. Then, the approval control unit 213 uses the first identification information to acquire the public data and the management data from the P2P database 221, and provides the public data and the management data to the management data creator. After the management data creator checks consistency between the public data and the management data, a predetermined approval operation (for example, pressing down of an approval button on a screen, or the like) is performed, and the approval control unit 213 registers the approval history to the P2P database 221. As a result, authenticity of the public data is ensured. In other words, a viewer in the second embodiment can recognize that public data is authentic by confirming that the approval history of the public data is registered to the P2P database 221.

Note that in a case where there is a plurality of management data creators (for example, a case where the management data creator is any business operator and the business is operator includes a plurality of persons, or the like), the approval process described above may be performed by the plurality of creators. For example, an approval flow may be provided, and a plurality of management data creators may perform an approval process in order according to the approval flow. In addition, such an approval process (including an approval flow) may be realized by any program owned by the management data creator, or may be realized by a P2P database program 222. Furthermore, in the above description, the management data creator performs the predetermined approval operation, and as a result, the approval history is registered to the P2P database 221. However, the present invention is not limited to this. For example, public data may be approved and the approval history may be registered to the P2P database 221 by any program owned by the management data creator or the P2P database program 222 autonomously checking consistency between public data and management data (without operation performed by the management data creator). Furthermore, in the above description, the management data creator performs an approval operation by using the node apparatus 200. However, the present invention is not limited to this. More specifically, the approval history may be registered to the P2P database 221 by the management data creator using an arbitrary information processing apparatus connected to the node apparatus 200 to perform an approval operation so that the content of the approval operation is linked to the node apparatus 200.

Figure 10:
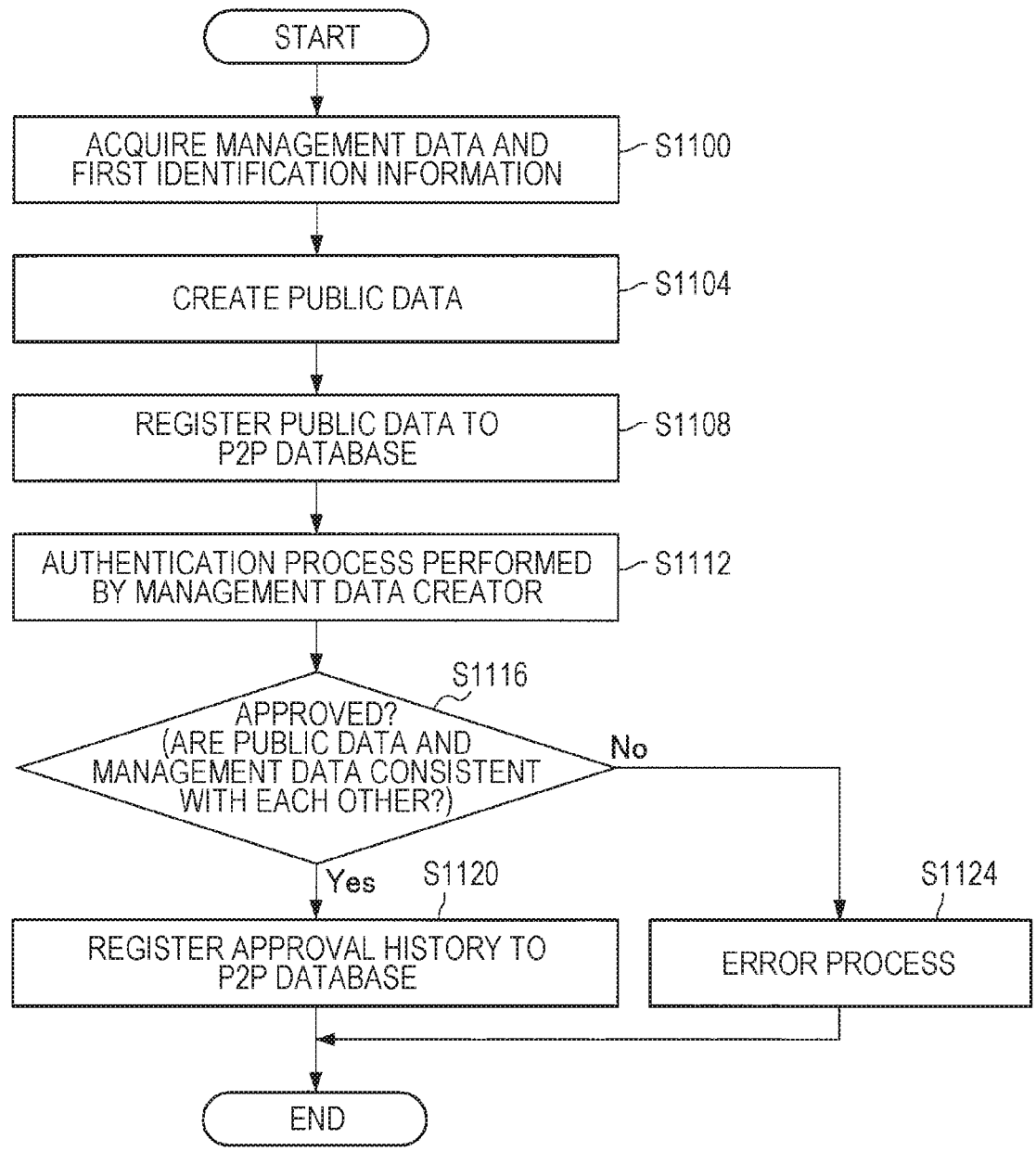
FIG. 10 is a flowchart illustrating a process flow of each apparatus according to the second embodiment of the present disclosure.

Subsequently, the process flow of the user apparatus 100 and the node apparatus 200 according to the second embodiment will be described with reference to FIG. 10. FIG. 10 illustrates an example of the process flow for registering public data to the P2P database 221.

In step S1100, the user apparatus 100 acquires management data and first identification information of the P2P database 221 from the node apparatus 200. In step S1104, on the basis of a request from the user, the creation control unit 111 of the user apparatus 100 creates public data by reconstructing the management data of the P2P database 221.

In step S1108, the registration control unit 112 provides to the node apparatus 200 request information requesting registration of the public data created by the creation control unit 111 to the P2P database 221, and the registration control unit 211 of the node apparatus 200 registers the public data to the P2P database 221. In step S1112, the management data creator uses the approval control unit 213 to perform the approval process. More specifically, the approval control unit 213 acquires public data and management data from the P2P database 221, and the management data creator checks consistency between the public data and the management data.

In a case where the management data creator checks consistency between the public data and the management data and thus approval is issued (step S1116/Yes), the approval control unit 213 registers the approval history to the P2P database 221 in step S1120, and thus a series of processes end. In a case where the management data creator does not confirm that the public data and the management data are consistent with each other and thus approval is not issued (step S1116/No), a predetermined error process as described in step S1020 in FIG. 8 is performed in step S1124, and thus a series of processes ends.

Note that the respective steps in the flowchart in FIG. 10 do not necessarily have to be processed in time series in the order described in the flowchart. That is, the respective steps in the flowchart may be processed in an order different from the order described in the flowchart, or may be processed in parallel.

4. Modification

The second embodiment according to the present disclosure has been described above. Subsequently, a modification according to the present disclosure will be described.

In the first embodiment and the second embodiment described above, there is a case where a third party other than the owner of management data of the P2P database 221 can create public data on the basis of the management data and can disclose the public data. For example, in a case where the management data and the first identification information are registered in the P2P database 221 in a state where the management data and the first identification information can be viewed by a third party, if the third party uses the disclosed management data of another person to create public data and registers the public data and the first identification information in association with each other to the P2P database 221, the third party can disclose the public data as his/her own data. As a result, for example, a third party can disclose as an exam score of himself/herself public data created by extracting a high exam score of another person or purchasing a high exam score from another person.

In view of the circumstances described above, the disclosing party of the present case has created a modification according to the present disclosure. In the modification according to the present disclosure, management data of a P2P database 221 and public data created on the basis of the management data include second identification information that uniquely identifies the user who is the owner of the management data and the public data.

Here, the second identification information may be any information as long as the second identification information can uniquely identify the user. For example, the second identification information may be a user ID of any service, a credit card number, a bank account number, a license number, an employee ID number, a student ID number, an e-mail address, a hash value of fingerprint data, a hash value of iris data hash, or the like.

Here, specific examples of the management data and the public data according to the modification will be described with reference to FIGS. 11A, 11B, 11C, and 11. Similarly to FIGS. 6A, 6B, 6C, 6D, 11A, 11B, 11C, and 11D illustrate a specific example of a case where management data and public data are exam scores, as an example.

First, assume that data illustrated in FIG. 11A is registered to a P2P database 221 as management data. Then, the management data illustrated in FIG. 11A includes second identification information "license number: 123456789" that is not included in the management data illustrated in FIG. 6A. In other words, the owner of the management data illustrated in FIG. 11A is uniquely specified by "license number: 123456789".

Then, the creation control unit 111 can create public data by deleting part of the management data, on the basis of a request from the user. For example, the creation control unit 111 can create public data as illustrated in FIG. 11B by deleting "address", "phone number", "academic background", "subject 1", "subject 5", and "total score" in FIG. 11A. Here, the management data illustrated in FIG. 11B includes the second identification information "license number: 123456789" that is not included in the management data illustrated in FIG. 6B.

Furthermore, assume that management data illustrated in FIG. 11C exists as management data different from the management data illustrated in FIG. 11A. Also the management data illustrated in FIG. 11C includes "license number: 123456789", which is the second identification information. Then, the creation control unit 111 can create public data by integrating the data illustrated in FIG. 11A and the data illustrated in FIG. 11C. For example, public data as illustrated in FIG. 11D can be created by integrating pieces of data from which "address", "phone number", "academic background", "subject 1", "subject 5", and "total score" which are the highlighted portions in FIGS. 11A and 11C are deleted.

Since the second portion illustrated in FIG. 11D is the portion of the management data illustrated in FIG. 11A, the second portion is associated with the first identification information "exam ID: A-123" of the management data illustrated in FIG. 11A. Furthermore, since the third portion is the portion of the management data illustrated in FIG. 11C, the third portion is associated with the first identification information "exam ID: B-234" of the management data illustrated in FIG. 11C. Note that since the first portion is the portion common to both the management data illustrated in FIG. 11A and the management data illustrated in FIG. 11C, the first portion is associated with both of the pieces of the first identification information and includes "license number: 123456789", which is the second identification information.

On the basis of a request from the user, the creation control unit 111 of the user apparatus 100 creates, for example, public data as illustrated in FIG. 11B or 11D. The registration control unit 112 requests the node apparatus 200 to register the public data to the P2P database 221.

Thereafter, the node apparatus 200 checks consistency between the public data and the management data of the P2P database 221. As a method of checking consistency, any one of the system according to the first embodiment described above (in other words, the system in which consistency between public data and management data is checked by the P2P database program 222 (for example, a chain code or the like)) or the system according to the second embodiment, (in other words, the system in which the management data creator checks consistency between public data and management data, and issues an approval, or the like) may be used.

In a case where the system according to the first embodiment is used, the registration control unit 211 of the node apparatus 200 executes the P2P database program 222 to acquire management data specified by first identification information associated with the public data from the P2P database 221, and checks whether or not the management data and the public data are consistent with each other. At this time, it is also checked whether or not the second identification information included in the management data and the second identification information included in the public data are same with each other. Then, in a case where the management data and the public data are consistent with each other (in other words, in a case where the second identification included in the management data and the second identification information included in the public data are also same with each other), the registration control unit 211 registers the public data to the P2P database 221.

In a case where the system of the second embodiment is used, the registration control unit 211 of the node apparatus 200 registers the public data to the P2P database 221 on the basis of the request information provided from the user apparatus 100. Thereafter, the approval control unit 213 uses the first identification information to provide to the management data creator the public data and management data acquired from the P2P database 221, and the management data creator checks consistency between the public data and the management data. At this time, it is also checked whether or not the second identification information included in the management data and the second identification information included in the public data are same with each other. Then, in a case where the management data and the public data are consistent with each other (in a case where the second identification information included in the management data and the second identification information included in the public data are also same with each other), the management data creator performs the predetermined approval operation (for example, pressing down of the approval button on a screen, or the like), and the approval control unit 213 registers the approval history to the P2P database 221.

As described above, when consistency between the management data and the public data is checked, consistency of the second identification information is also checked. Therefore, the modification according to the present disclosure can prevent a third party other than the owner of the management data from creating public data on the basis of the management data and disclosing the public data as data of his/her own, while ensuring authenticity of the public data. More specifically, in a case where a third party other than the owner of the management data creates public data on the basis of management data of another person, the second identification information included in the management data and the second identification information included in the public data are not consistent with each other and the public data is not handled as authentic data. Therefore, the modification according to the present disclosure is useful.

5. Hardware Configuration Example

Subsequently, a modification according to the present disclosure has been described above. Subsequently, a hardware configuration of each apparatus according to the present disclosure will be described with reference to FIG. 12.

Figure 12:
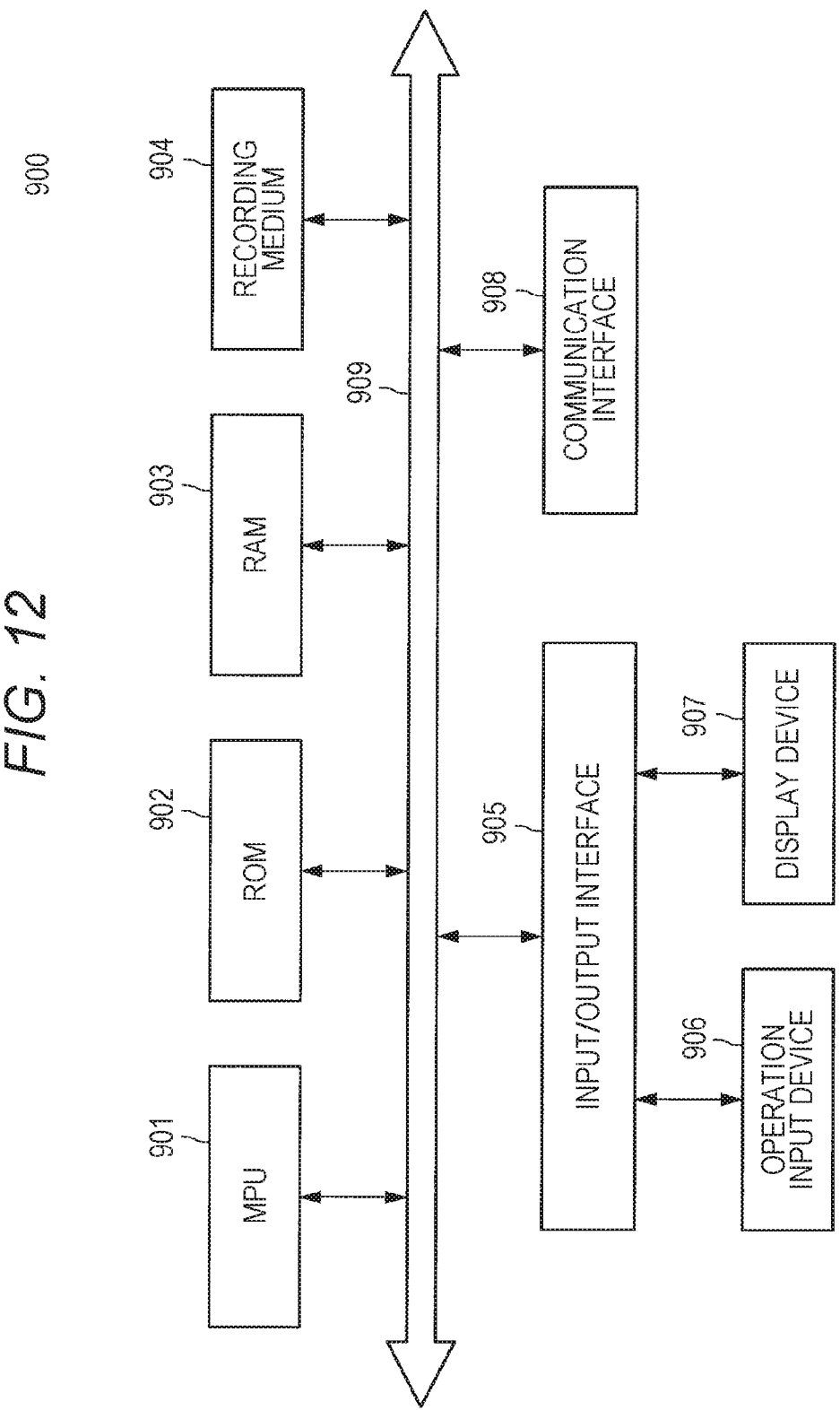
FIG. 12 is a block diagram illustrating a hardware configuration example of an information processing apparatus 900 that realizes the user apparatus 100 or the node apparatus 200 according to the present disclosure.

FIG. 12 is a block diagram illustrating an example of the hardware configuration of the user apparatus 100 or the node apparatus 200 according to the present disclosure. The user apparatus 100 or the node apparatus 200 according to the present embodiment can be realized by an information processing apparatus 900 illustrated in FIG. 12.

The information processing apparatus 900 includes, for example, an MPU 901, a ROM 902, a RAM 903, a recording medium 904, an input/output interface 905, an operation input device 906, a display device 907, and a communication interface 908. Furthermore, the information processing apparatus 900 connects respective constituents, for example, with a bus 909 as a data transmission path.

The MPU 901 includes, for example, one or two or more processors including an arithmetic circuit such as an MPU, various processing circuits, and the like and functions as the control unit 110 of the user apparatus 100 or the control unit 210 of the node apparatus 200. Note that the control unit 110 of the user apparatus 100 or the control unit 210 of the node apparatus 200 may include a dedicated (or general-purpose) circuit (for example, a processor or the like separate from the MPU 901) capable of realizing the various types of processes described above.

The ROM 902 stores control data such as a program, an arithmetic parameter, and the like that the MPU 901 uses. The RAM 903 temporarily stores, for example, a program executed by the MPU 901, and the like.

The recording medium 904 functions as the storage unit 140 of the user apparatus 100 or the storage unit 220 of the node apparatus 200. For example, the recording medium 904 stores various data such as data and various programs regarding information processing according to the present embodiment such as management data, public data, the P2P database 221, the P2P database program 222, or the like. Here, a magnetic recording medium such as a hard disk, a non-volatile memory such as a flash memory, or the like can be cited as an example of the recording medium 904. Furthermore, the recording medium 904 may be attachable to and detachable from the information processing apparatus 900.

The input/output interface 905 connects, for example, the operation input device 906 and the display device 907. Here, a universal serial bus (USB) terminal, a digital visual interface (DVI) terminal, a high-definition multimedia interface (HDMI) (registered trademark) terminal, various processing circuits, or the like can be cited as an example of the input/output interface 905.

Furthermore, for example, the operation input device 906 is provided on the information processing apparatus 900, and is connected to the input/output interface 905 inside the information processing apparatus 900. A keyboard, a mouse, a keypad, a touch panel, a microphone, an operation button, a rotary selector such as a direction key or a jog dial, or a combination thereof can be cited as an example of the operation input device 906. The operation input device 906 functions as the input unit 120 of the user apparatus 100.

Furthermore, for example, the display device 907 is provided on the information processing apparatus 900, and is connected to the input/output interface 905 inside the information processing apparatus 900. A liquid crystal display (liquid crystal display), an organic electro-luminescence display (organic EL display), or the like can be cited as an example of the display device 907. The display device 907 functions as the output unit 130 of the user apparatus 100.

Note that it goes without saying that the input/output interface 905 can be connected to an external device such as an operation input device or a display device outside the information processing apparatus 900. Furthermore, the display device 907 may be, for example, a device such as a touch panel, capable of performing display and being operated by a user.

The communication interface 908 is communication means included in the information processing apparatus 900, and functions as the communication unit 150 of the user apparatus 100 or the communication unit 230 of the node apparatus 200. Furthermore, the communication interface 908 may have the function of performing wireless or wired communication with, for example, any external apparatus such as a server via any network (or directly). Here, a communication antenna and radio frequency (RF) circuit (wireless communication), an IEEE802.15.1 port and a transmission and reception circuit (wireless communication), an IEEE802.11 port and a transmission and reception circuit (wireless communication), a local area network (LAN) terminal and a transmission and reception circuit (wired communication), or the like can be cited as an example of the communication interface 908.

Note that the hardware configuration of the information processing apparatus 900 according to the present embodiment is not limited to the configuration illustrated in FIG. 12. For example, the information processing apparatus 900 may not include the communication interface 908 in the case of performing communication via a connected external communication device. In addition, the communication interface 908 may be configured to be able to perform communication by using a plurality of communication systems. Further, the information processing apparatus 900 may not include, for example, the operation input device 906, the display device 907, or the like. Furthermore, for example, some or all of the configurations illustrated in FIG. 12 may be realized by one or two or more integrated circuits (ICs).

6. Summary

As described above, in the information processing system according to the present disclosure, the user himself/herself who is the owner of management data of the P2P database 221 can disclose the management data while maintaining authenticity thereof. A more specific description will be given. The user apparatus 100 creates public data by reconfiguring management data in the P2P database 221. Then, in the first embodiment, the node apparatus 200 executes the P2P database program 222 to check consistency between the public data and the management data, and then registers the public data to the P2P database 221. Furthermore, in the second embodiment, the node apparatus 200 registers the public data to the P2P database 221, and the management data creator checks consistency between the public data and the management data, and issues an approval. As described above, authenticity of the public data is maintained. Furthermore, in the first embodiment and the second embodiment, since the public data does not include information that can identify the user, the user can disclose the public data anonymously.

Furthermore, in the modification according to the present disclosure, management data and public data include second identification information that uniquely identifies the user who is the owner of the management data and the public data. Therefore, when consistency between the management data and the public data is checked, consistency of the second identification information is also checked. Therefore, the modification according to the present disclosure can prevent a third party other than the owner of the management data from creating public data on the basis of the management data and disclosing the public data as data of his/her own, while ensuring authenticity of the public data.

While the preferred embodiments of the present disclosure have been described in detail with reference to the accompanying drawings, the technical scope of the present disclosure is not limited to such examples. It is obvious that a person skilled in the art to which the present disclosure pertains can conceive various modifications and corrections within the scope of the technical idea described in the claims, and it is naturally understood that these also belong to the technical scope of the present disclosure.

For example, as described above, the present disclosure may be applied to any system, apparatus, service, and the like as long as a P2P database is used. For example, in addition to the learning achievement and activity recording service, the present disclosure may be applied to any traceability service (for example, a crop traceability service, a livestock traceability service, a product traceability service, or the like), any review site (for example, a restaurant review site, a book review site, a lodging review site, or the like), any resident management service (for example, resident entry and exit management, pension management by administration, or the like), or the like.

Furthermore, the effects described in the present Description are illustrative or exemplary only and are not limited. That is, the technique according to the present disclosure can exhibit other effects that are apparent to those skilled in the art from the description of the present Description in addition to or in lieu of the effects described above.

Note that the following configurations also belong to the technical scope of the present disclosure.

(1)

An information processing apparatus including
a creation unit that creates public data by using management data of a P2P database, and
a registration control unit that controls registration of the public data to the P2P database, on the basis of first identification information that uniquely identifies the management data.

(2)

The information processing apparatus according to the (1),
in which the registration control unit controls the registration so as to associate the public data with the first identification information.

(3)

The information processing apparatus according to the (2), in which the creation unit creates the public data on the basis of a request from a user who owns the management data.

(4)

The information processing apparatus according to the (3),
in which each of the public data and the management data includes second identification information that uniquely identifies the user.

(5)

The information processing apparatus according to any one of the (2) to (4),
in which the public data includes data obtained by deleting part of the management data.

(6)

The information processing apparatus according to any one of the (2) to (5),
in which the public data includes data obtained by integrating a plurality of pieces of the management data.

(7)

The information processing apparatus according to any one of the (2) to (6),
in which the registration control unit controls the registration, in a case where the public data and the management data are consistent with each other, on the basis of the first identification information.

(8)

The information processing apparatus according to the (7), in which the registration control unit uses a predetermined program provided in the P2P database and executed on the P2P database, to check consistency between the public data and the management data.

9

The information processing apparatus according to any one of the (2) to (6) further including an approval control unit that issues an approval in a case where the public data and the management data are consistent with each other, and controls registration of an approval history to the P2P database, on the basis of the first identification information.

10

The information processing apparatus according to any one of the (1) to (9), in which the P2P database is blockchain data.

11

An information processing method executed by a computer, the method including creating public data by using management data of a P2P database, and controlling registration of the public data to the P2P database, on the basis of first identification information that uniquely identifies the management data.

12

A program causing a computer to create public data by using management data of a P2P database, and to control registration of the public data to the P2P database, on the basis of first identification information that uniquely identifies the management data.

REFERENCE SIGNS LIST

100 User apparatus
110 Control unit
111 Creation control unit
112 Registration control unit
120 Input unit
130 Output unit
140 Storage unit
150 Communication unit
200 Node apparatus
210 Control unit
211 Registration control unit
212 Acquisition control unit
213 Approval control unit
220 Storage unit
221 P2P database
222 P2P database program
230 Communication unit
300 Network
400 P2P network

The invention claimed is:
1. An information processing apparatus, comprising:
a creation unit configured to:
receive a plurality of pieces of management data of a peer-to-peer (P2P) database and a plurality of pieces of first identification information, wherein the plurality of pieces of first identification information includes:
a first piece of first identification information that uniquely identifies a first piece of management data of the plurality of pieces of management data, and
a second piece of first identification information that uniquely identifies a second piece of management data of the plurality of pieces of management data; and
integrate the first piece of management data with the second piece of management data to create public data that includes:
the first piece of first identification information,
a first portion of the first piece of management data,
the second piece of first identification information, and
a first portion of the second piece of management data; and
a registration control unit configured to control registration of the public data to the P2P database, based on the plurality of pieces of first identification information.

2. The information processing apparatus according to claim 1, wherein the registration control unit is further configured to control the registration so as to associate the public data with the plurality of pieces of first identification information.

3. The information processing apparatus according to claim 2, wherein
the plurality of pieces of management data corresponds to data of a user, and
the creation unit is further configured to create the public data based on a request from the user.

4. The information processing apparatus according to claim 3, wherein the public data and each piece of management data of the plurality of pieces of management data include second identification information that uniquely identifies the user.

5. The information processing apparatus according to claim 2, wherein the creation unit is further configured to delete at least one of a second portion of the first piece of management data or a second portion of the second piece of management data to create the public data.

6. The information processing apparatus according to claim 2, wherein the registration control unit is further configured to control the registration, in a case where the public data is consistent with the plurality of pieces of management data, based on the plurality of pieces of first identification information.

7. The information processing apparatus according to claim 6, wherein the registration control unit is further configured to execute a specific process corresponding to the P2P database to check consistency between the public data and the plurality of pieces of management data.

8. The information processing apparatus according to claim 2, further comprising an approval control unit configured to:
issue an approval in a case where the public data is consistent with the plurality of pieces of management data; and
control registration of an approval history to the P2P database, based on the plurality of pieces of first identification information, wherein the approval history includes the issued approval.

9. The information processing apparatus according to claim 1, wherein the P2P database is blockchain data.

10. An information processing method executed by a computer, the method comprising:
receiving a plurality of pieces of management data of a peer-to-peer (P2P) database and a plurality of pieces of identification information, wherein the plurality of pieces of identification information includes:
a first piece of identification information that uniquely identifies a first piece of management data of the plurality of pieces of management data, and
a second piece of identification information that uniquely identifies a second piece of management data of the plurality of pieces of management data;
integrating the first piece of management data with the second piece of management data for creating public data that includes:
the first piece of identification information,
a portion of the first piece of management data,
the second piece of identification information, and
a portion of the second piece of management data; and
controlling registration of the public data to the P2P database, based on the plurality of pieces of identification information.

11. A non-transitory computer-readable medium having stored thereon, computer-executable instructions which, when executed by a computer, cause the computer to execute operations, the operations comprising:
receiving a plurality of pieces of management data of a peer-to-peer (P2P) database and a plurality of pieces of identification information, wherein the plurality of pieces of identification information includes:
a first piece of identification information that uniquely identifies a first piece of management data of the plurality of pieces of management data, and
a second piece of identification information that uniquely identifies a second piece of management data of the plurality of pieces of management data;
integrating the first piece of management data with the second piece of management data for creating public data that includes:
the first piece of identification information,
a portion of the first piece of management data,
the second piece of identification information, and
a portion of the second piece of management data; and
controlling registration of the public data to the P2P database, based on the plurality of pieces of identification information.

* * * * *